United States Patent [19]
Spisak et al.

[11] Patent Number: 5,191,964
[45] Date of Patent: Mar. 9, 1993

[54] ROTATING CARTON TRANSFER MECHANISM

[75] Inventors: Anthony F. Spisak, Redford; James A. Kirn, Union Lake, both of Mich.

[73] Assignee: Elopak Systems A.G., Glattbrugg, Switzerland

[21] Appl. No.: 858,032

[22] Filed: Mar. 26, 1992

[51] Int. Cl.⁵ .................................................. B65G 47/26
[52] U.S. Cl. ...................................... 198/447; 198/430; 198/468.2; 53/565
[58] Field of Search ............. 198/426, 427, 429, 430, 198/433, 447, 448, 468.2, 468.4; 53/565, 251, 253

[56] References Cited

U.S. PATENT DOCUMENTS

| | | | |
|---|---|---|---|
| 1,846,009 | 2/1932 | White et al. | 198/792 |
| 2,259,728 | 10/1941 | Bridges | 49/1 |
| 2,722,354 | 11/1955 | Mapes | 226/14 |
| 2,836,313 | 5/1958 | Yeo et al. | 198/430 |
| 3,047,164 | 7/1962 | Meckstroth | 198/468.2 |
| 3,066,787 | 12/1962 | Allgeyer | 198/468.2 |
| 3,115,966 | 12/1963 | Leiter | 198/468.2 |
| 3,392,492 | 7/1968 | Stein | 51/108 |
| 3,570,058 | 3/1971 | Heining et al. | 198/468.2 |
| 3,598,221 | 8/1971 | Klimaschka et al. | 198/468.2 |
| 3,603,445 | 9/1971 | Zausch | 198/31 AA |
| 3,837,472 | 9/1974 | Byerly | 198/430 |
| 3,968,885 | 7/1976 | Hassan et al. | 214/1 BC |
| 4,164,997 | 8/1979 | Mueller | 198/427 |
| 4,448,008 | 5/1984 | Pankratz et al. | 53/565 |
| 4,448,013 | 5/1984 | Nakajima | 53/565 |
| 4,456,118 | 6/1984 | Kauffman et al. | 198/480 |
| 4,588,391 | 5/1986 | Evans et al. | 493/165 |
| 4,697,691 | 10/1987 | Zodrow et al. | 198/425 |
| 4,936,440 | 6/1990 | Focke | 198/427 |

Primary Examiner—Joseph E. Valenza
Attorney, Agent, or Firm—Reising, Ethington, Barnard, Perry & Milton

[57] ABSTRACT

A forming, filling, and sealing machine, whereon a carton transfer mechanism includes an indexing turret having a plurality of dual mandrels formed thereon, and two bottom-closed pivotally mounted carriers for alternately moving two cartons at a time from two respective indexed dual mandrels to a conveyor. The conveyor is adapted to receive two sets of two cartons each before indexing four cartons at a time to a filling station.

8 Claims, 1 Drawing Sheet

ROTATING CARTON TRANSFER MECHANISM

TECHNICAL FIELD

This invention relates generally to forming, filling, and sealing machines for cartons and, more particularly, to a rotating transfer mechanism therefor, operative between a turret and a conveyor for transferring cartons therebetween.

BACKGROUND ART

Heretofore, transfer mechanism for forming, filling, and sealing machines have generally included devices for stripping one or two bottom-sealed cartons from the mandrels of single or dual turrets of the machine, and placing them in one or two receptacles on a conveyor positioned directly below the mandrels.

Kauffman et al U.S. Pat. No. 4,456,118 discloses a carton transfer mechanism adaptable to removing two single cartons, one after the other, from two spaced radial mandrels of an indexing turret, and placing same onto a conveyor during respective indexing movement and dwell time of said conveyor.

Evans et al U.S. Pat. No. 4,588,391 discloses a carton transfer mechanism including a transfer conveyor disposed intermediate a main conveyor and a turret having a plurality of spaced radial mandrels, wherein individual cartons are removed from respective mandrels, placed in pockets of the transfer conveyor, which is indexed until a predetermined number of aligned cartons are transferred to the main conveyor.

DISCLOSURE OF THE INVENTION

A general object of the invention is to provide an improved carton transfer mechanism for use on forming, filling, and sealing machines.

Another object of the invention is to provide a carton transfer mechanism for transferring two cartons at a time from a dual mandrel turret to a conveyor adapted to index four cartons at a time.

A further object of the invention is to provide a carton transfer mechanism including a dual mandrel turret, a conveyor, and two pivotable dual carriers adapted to alternately transfer two cartons from two successive dual mandrels to the conveyor.

These and other objects and advantages will become more apparent when reference is made to the following drawings and the accompanying description.

BEST MODE OF CARRYING OUT THE INVENTION

Figure 1:
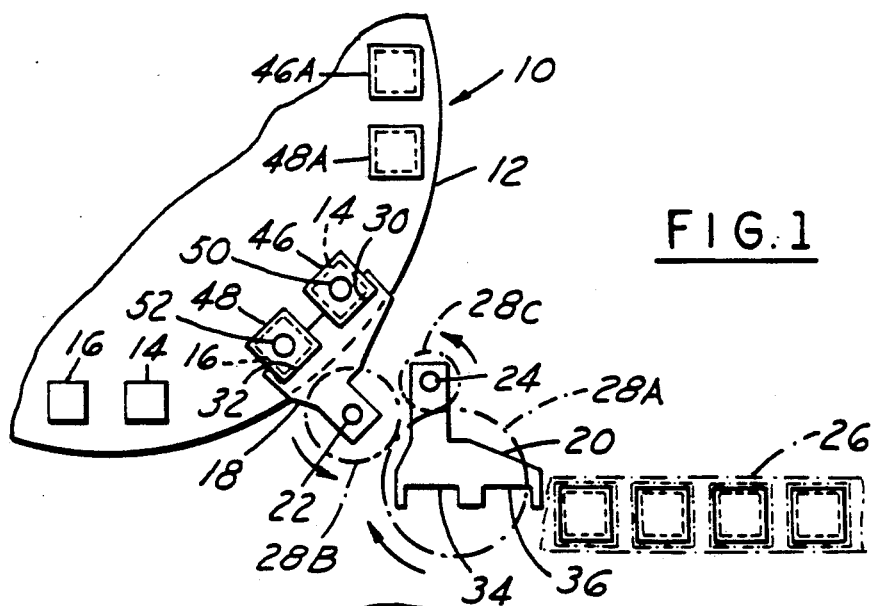
FIGS. 1-3 are schematic diagrams of a carton transfer mechanism embodying the invention, as viewed from below and illustrating three different operational positions.

Referring now to the drawings in greater detail, the Figures illustrate a rotating transfer mechanism 10, including a turret 12 having spaced dual mandrels thereon, in the sense of two side-by-side mandrels 14 and 16 at each index position; two dual carriers 18 and 20 pivotally mounted on respective pivot pins 22 and 24 adjacent the 4:30 o'clock station of the turret 12; and a conveyor, represented as 26. The conveyor 26 is adapted to index four aligned cartons at a time. The dual carriers 18 and 20 are operatively connected to a suitable gear drive arrangement, represented as 28A, 28B and 28C.

Each dual carrier 18 and 20 includes two side-by-side receiving pockets formed therein, namely, 30 and 32 on the carrier 18, and 34 and 36 on the carrier 20. The pockets 30 and 34 are longitudinally aligned with the respective pivot pins 22 and 24, and the pockets 32 and 36 are offset from the respective pockets 30 and 34.

Receptacles 38, 40, 42 and 44 are formed in conveyor 26, and repeated along the length of the conveyor.

In the well known manner, a pair of open-ended cartons 46 and 48 are loaded onto a pair of mandrels 14 and 16 at a designated station, the extended open end closure is then folded and sealed at subsequent stations, prior to being indexed to the 4:30 o'clock station.

In operation, the carrier 18 is pivotally positioned to receive the cartons 46 and 48 in the pockets 30 and 32, respectively, when the cartons are pulled vertically off of the mandrels 14 and 16 (FIG. 1) by any suitable means, such as suction cups, represented as 50 and 52 into the respective pockets 30 and 32. Once loaded, the carrier 18 is pivoted by the gear 28 in a counterclockwise direction, in response to the clockwise direction of the drive gear 28A, until the cartons 46 and 48 are aligned with the pockets 38 and 40 of the conveyor 26 (FIG. 2).

Simultaneously, the turret 12 is indexed one station, and the carrier 20 is pivoted counterclockwise by the gear 28C so as to have the pockets 34 and 36 aligned with the next pair of mandrels 14 and 16.

Figure 2:
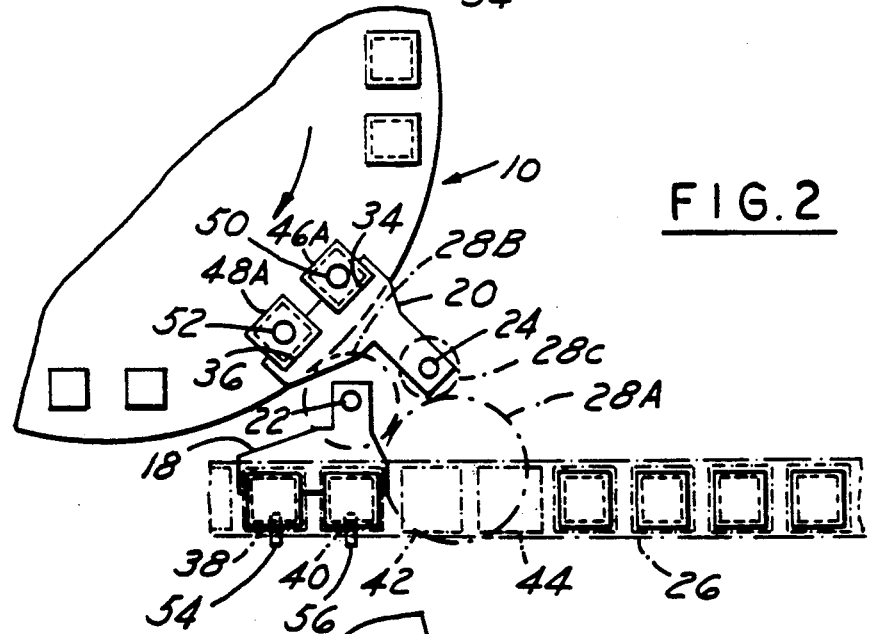
Figure 3:
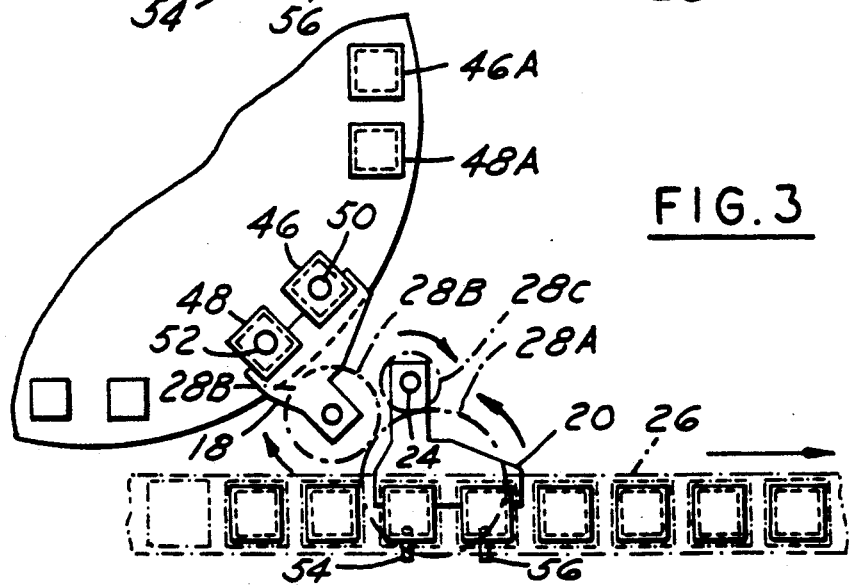

The two cartons 46 and 48 in the carrier 18 are being unloaded into the receptacles 38 and 40 while the next two cartons 46A and 48A are being loaded into the pockets 34 and 36 of the carrier 20 (FIG. 2). Specifically, the cartons 46 and 48 are vertically stripped from the respective pockets 30 and 3 by movable arms 54 and 56 having fingers 58 and 60 formed on the respective ends thereof for engaging the top edges of the open-topped cartons 46 and 48 (or 46A and 48A), to enter the receptacles 38 and 40 (or 42 and 44). While the conveyor 26 remains stationary, the now loaded carrier 20 is pivoted by the gear 28C in a clockwise direction, in response to the counterclockwise direction of the drive gear 28A, to have the pockets 34 and 36 aligned with the receptacles 42 and 44 (FIG. 3). During this step, the turret 12 is indexed again, and the carrier 18 is pivoted by the gear 28B in a clockwise direction back to the next dual mandrels 14 and 16.

The cartons 46A and 48A are transferred from the pockets 34 and 36 to the receptacles 42 and 44, as described above, and the conveyor 26 indexes the four cartons to the right in FIG. 3, toward a filling station, and brings the next four receptacles forward for the next cycle.

INDUSTRIAL APPLICABILITY

It should be apparent that the invention provides an improved, simplified, and efficient transfer mechanism for transferring two sets of dual cartons at a time from a dual mandrel turret to a conveyor adapted to convey four cartons at a time.

While but one embodiment has been shown and described, other modifications are possible within the scope of the following claims.

What is claimed is:

1. On a forming, filling, and sealing machine, a carton transfer mechanism comprising an indexing turret having a plurality of dual mandrels formed thereon, two bottom closed cartons mounted on each of said dual mandrels, a conveyor adapted to receive two sets of two cartons before indexing the four cartons, and carrier means for alternately moving two cartons at a time from two respective dual mandrels to said conveyor.

2. The carton transfer mechanism described in claim 1, wherein said carrier means includes two pivotally mounted carriers, each having two side-by-side pockets formed therein for receiving two cartons, with one carrier being adapted to receive two cartons from one dual mandrel while the other carrier is adapted to present two cartons to said conveyor, and thereafter alternating for two additional sets of two cartons.

3. The carton transfer mechanism described in claim 2, and a pivot pin for each carrier, wherein one of said two side-by-side pockets of each carrier is longitudinally aligned with the carrier's pivot pin and the other of said side-by-side pockets is off-set from said one of said pockets.

4. The carton transfer mechanism described in claim 2, and gear drive means for pivoting said two carriers in one direction first and then in the other direction to accomplish the transfers.

5. The carton transfer mechanism described in claim 4, wherein said gear drive means includes a reciprocally rotatable drive gear, and two driven gears meshing therewith and operatively connected to said respective two carriers to pivot said carriers in response to rotation of said driven gears by said drive gear.

6. The carton transfer mechanism described in claim 1, and suction cup means for transferring two cartons at a time from said dual mandrels to said carrier means.

7. The carton transfer mechanism described in claim 1, and movable arm and finger means for transferring two cartons at a time from said carrier means to said conveyor.

8. On a forming, filling, and sealing machine, a carton transfer mechanism comprising an indexing turret having a plurality of dual mandrels formed thereon, two cartons mounted on each of said dual mandrels, first and second pivotally mounted carriers, each adapted to receive two cartons at a time from a dual mandrel, first means for transferring said two cartons at a time from said dual mandrel to one of said first and second carriers, a conveyor adapted to receive two cartons at a time from a carrier, second means for transferring said two cartons at a time from said one of said first and second carriers to said conveyor drive means for alternately pivoting the first and second carriers in a counterclockwise directions from a first dual mandrel to the conveyor and to move the second carrier to a second dual mandrel indexed by said turret and in a clockwise direction from said second dual mandrel to the conveyor and to move the first carrier to a third dual mandrel indexed by said turret.

* * * * *